United States Patent
Pedersen (12)

(10) Patent No.: US 6,304,351 B1
(45) Date of Patent: Oct. 16, 2001

(54) UNIVERSAL BRANCHING UNIT

(75) Inventor: Bo Pedersen, Rumson, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/181,424

(22) Filed: Oct. 28, 1998

(51) Int. Cl.$^7$ ........................................................ H04J 14/02
(52) U.S. Cl. ............................................ 359/130; 359/128
(58) Field of Search ................................... 359/130, 124, 359/127, 128; 385/32, 37

(56) References Cited

U.S. PATENT DOCUMENTS

| 5,841,583 | * | 11/1998 | Bhagavatula | ........................ 359/577 |
| 6,078,597 | * | 6/2000 | Feuer | ........................................ 372/6 |

FOREIGN PATENT DOCUMENTS

WO-97/
37446-A1  *  10/1997  (WO)  ............................ H04B/10/18

* cited by examiner

*Primary Examiner*—Jason Chan
*Assistant Examiner*—Christina Y. Leung

(57) ABSTRACT

A branching unit is provided for directing individual wavelengths of a WDM optical communication signal among a transmitting terminal, a receiving terminal and a branch terminal. The branching unit includes first and second cross bar switches each having at least a first, second and third port such that in a first state the first cross bar directs an optical signal appearing on the first port to the second port and in a second state the first cross bar directs the optical signal from the first port to the third port. A reflective filter couples the third port of the first switch to the third port of the second switch. The reflective filter is configured to reflect a prescribed wavelength and to transmit therethrough all remaining wavelengths forming the WDM signal. An optical fiber couples the second port of the first switch to the second port of the second switch. First and second circulators are also provided, which each have an input, output and an intermediate port. The intermediate port of the first and second circulators are coupled to the first port of the first and second switches, respectively. The input port of the first circulator is adapted to receive the WDM signal from the transmitting terminal and the output port of the first circulator is adapted to receive the prescribed wavelength and transmit it to the branching terminal. The input port of the second circulator is adapted to receive the prescribed wavelength from the branching terminal and the output port of the first circulator is adapted to receive the WDM signal and transmit it to the receiving terminal.

13 Claims, 5 Drawing Sheets

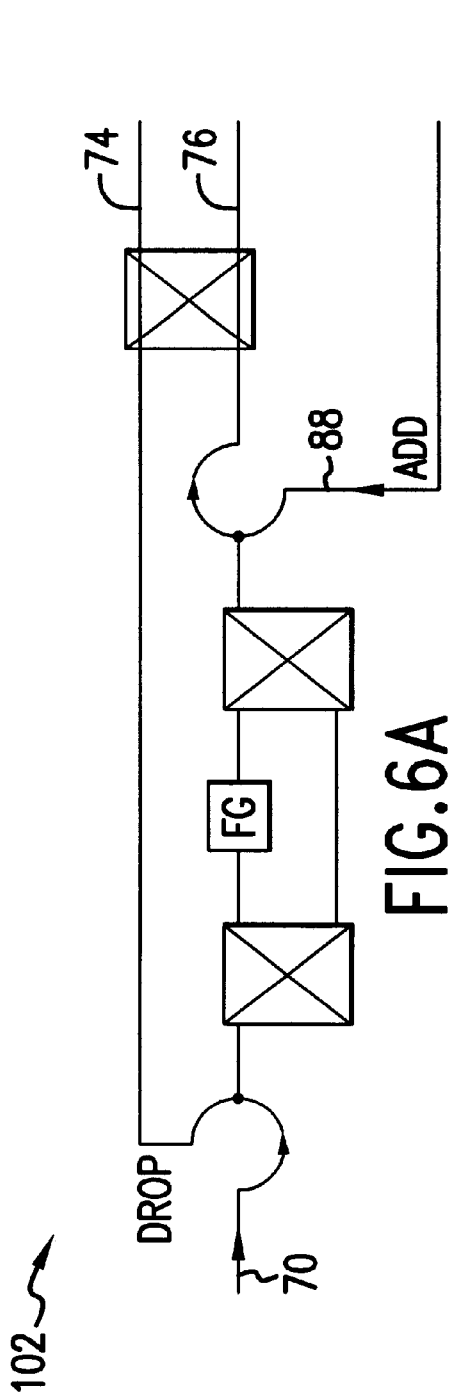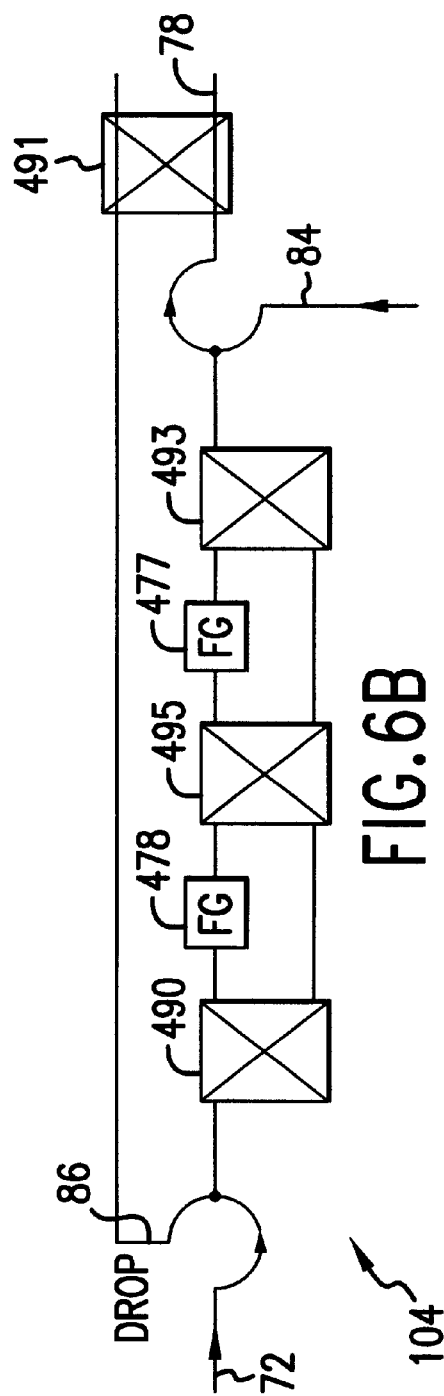

UNIVERSAL BRANCHING UNIT

FIELD OF THE INVENTION

The invention relates to optical signal processing in a lightwave communications system. More particularly, the invention relates to a branching unit that can both transmit and drop selected wavelengths of a wavelength division multiplexed signal.

BACKGROUND OF THE INVENTION

Lightwave communications systems applied in the field of telecommunications can be broadly classified into two categories. These two categories are referred to as long-haul and short-haul systems, depending on whether the optical signal is transmitted over relatively long or short distances compared with typical intercity distances (approximately 50 to 100 kilometers). Long-haul communications systems require high-capacity trunk lines and can transmit information over several thousands of kilometers using optical amplifiers.

Long-haul communications systems are used to carry international communications traffic from one continent to another. Since this often requires the laying of fiber trunk lines underwater, these systems are often referred to as submarine systems.

In submarine systems, as well as terrestrial systems, it becomes necessary to direct certain wavelengths of wavelength-multiplexed optical signals carried on these high-capacity fiber trunks. This typically occurs to conform to desired traffic routing parameters.

The optical component used to redirect these signals is referred to as an optical add-drop multiplexer (ADM). An ADM is known as a key device for use in splitting and inserting wavelength-division multiplexed optical signals.

Undersea optical communication systems include transmitter and receiver terminals connected by a fiber transmission medium and repeaters containing optical amplifiers that compensate for attenuation in the fiber. To provide increased flexibility in undersea network architecture beyond simple point to-point interconnects, a branching unit is provided, which allows traffic to be split or switched to multiple landing points, which are referred to as branch terminals. The branching unit contains the ADM that redirects the optical signals from the trunk connecting the transmitting and receiving terminals to the branch terminal. In addition to serving as optical interconnects, branching units also provide and manage electrical power to the repeaters. In wavelength division multiplexed communication systems, the branching unit drops selected wavelengths or channels to the branch terminals while transmitting the remaining wavelengths that compose the WDM signal.

U.S. Appl. Ser. No. 08/728,591 discloses a branching unit which drops optical information signals of selected wavelengths received from a transmitting trunk terminal to a branch terminal. This known branching unit transmits all the wavelengths of a WDM signal except for those information signals carried at the selected wavelengths that are to be added or dropped to the branch terminal. The branch terminal replaces the received optical information signal at each selected wavelength with another optical information signal. The new optical information signal, carried at the selected wavelength, is transmitted by the branch terminal to the branching unit, which in turn multiplexes the selected wavelength onto the WDM signal. The end result is that the branching unit drops certain information signals while receiving additional optical information signals to replace the dropped signals. The additional information signal is then carried along with the other WDM signals.

However, one limitation of this branching unit is that the selected wavelength to be added/dropped cannot be changed for a given branching unit. Moreover, the same branching unit cannot process different combinations of two of more selected wavelengths in an add/drop mode.

It therefore would be desirable to provide a single branching unit in which any combination of selected wavelengths to be added/dropped can be arranged.

SUMMARY OF THE INVENTION

In accordance with the present invention, a branching unit is provided for directing individual wavelengths of a WDM optical communication signal among a transmitting terminal, a receiving terminal and a branch terminal. The branching unit includes first and second cross bar switches each having at least a first, second and third port such that in a first state the first cross bar directs an optical signal appearing on the first port to the second port and in a second state the first cross bar directs the optical signal from the first port to the third port. A reflective filter couples the third port of the first switch to the third port of the second switch. The reflective filter is configured to reflect a prescribed wavelength and to transmit therethrough all remaining wavelengths forming the WDM signal. An optical fiber couples the second port of the first switch to the second port of the second switch. First and second circulators are also provided, which each have an input, output and an intermediate port. The intermediate port of the first and second circulators are coupled to the first port of the first and second switches, respectively. The input port of the first circulator is adapted to receive the WDM signal from the transmitting terminal and the output port of the first circulator is adapted to receive the prescribed wavelength and transmit it to the branching terminal. The input port of the second circulator is adapted to receive the prescribed wavelength from the branching terminal and the output port of the first circulator is adapted to receive the WDM signal and transmit it to the receiving terminal.

BRIEF DESCRIPTION OF THE DRAWINGS

FIG. 2(*b*) is a schematic diagram of a second known ADM.

FIG. 2(*c*) is a schematic diagram of a third known ADM.

FIG. 6 is a block diagram in accordance with a second embodiment of a BU incorporating the ADMs shown in FIGS. 3 or 4.

DETAILED DESCRIPTION

Figure 1:
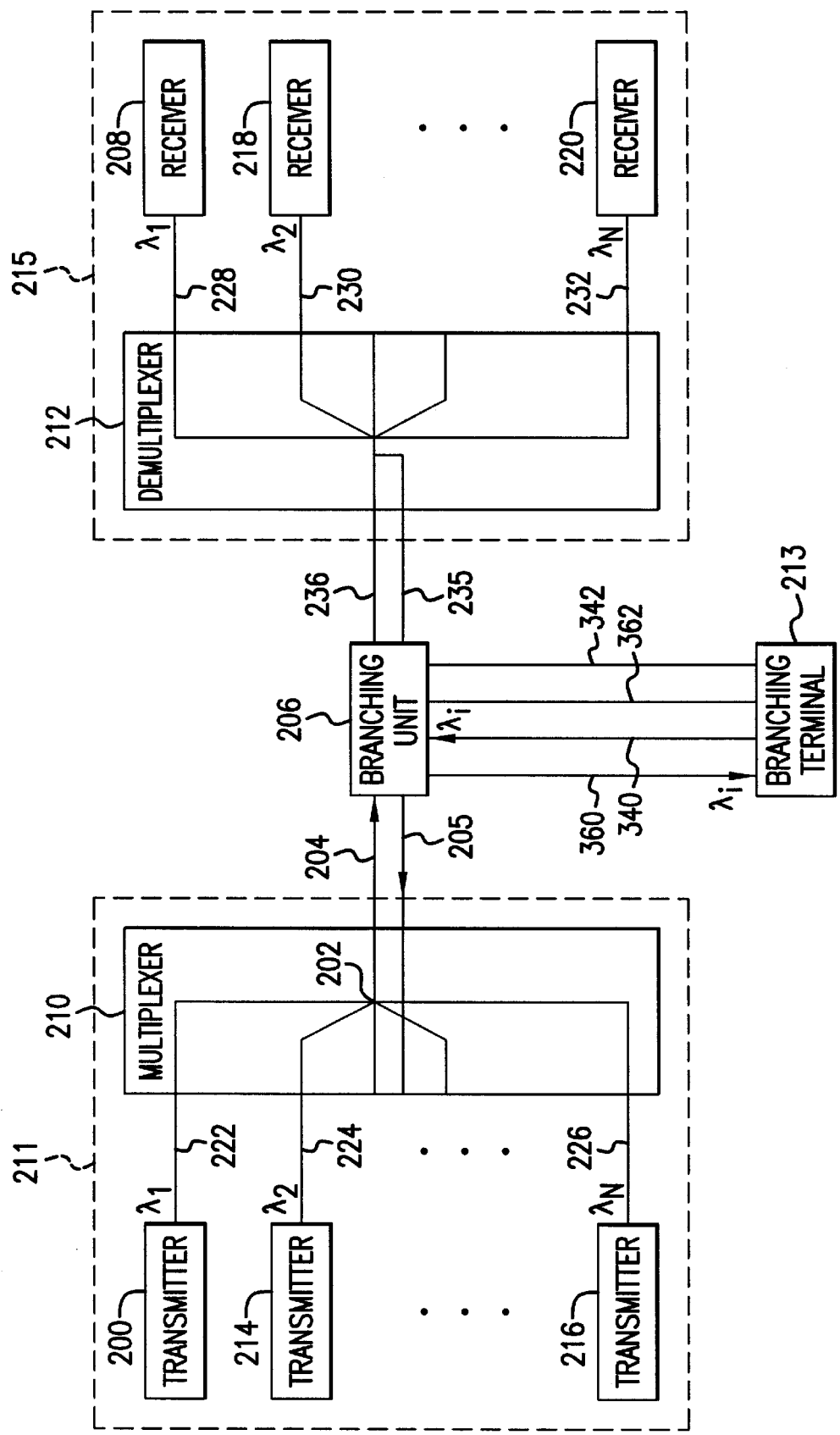
FIG. 1 is a block diagram of a lightwave communications system in which an embodiment of the present invention may be deployed.

This section describes the present invention with reference in detail to the drawings wherein like parts are designated by like reference numerals throughout.

FIG. 1 illustrates a block diagram of a trunk and branch lightwave communications system in which an embodiment of the present invention may be deployed. FIG. 1 illustrates a high-capacity wavelength division multiplexing (WDM) lightwave communications system. In its simplest form, WDM is used to transmit two channels in different transmission windows of the optical fiber. For example, an existing lightwave system operating at $\lambda N$ can be upgraded in capacity by adding another channel of wavelength $\lambda P$. A typical WDM system operates in the 1550 nanometer (nm) window, for example, $\lambda 1$ to $\lambda N$ in the range from 1530 nm to 1565 nm.

As seen in FIG. 1, the network includes transmission trunk terminal 211 and receiver trunk terminal 215 interconnected by optical fiber links 204, 236, 205 and 235, which support bi-directional optical communication. The network also includes branching unit 206 and branch terminal 213. Branch terminal 213 includes transmitters and receivers (not shown) similar to trunk terminals 211 and 215. Branching unit 206 is disposed in the transmission path between trunk terminals 211 and 215. Branching unit 206 directs selected wavelengths to branch terminal 213.

As shown, trunk terminal 211 includes optical communication transmitters 200, 214 and 216 to transmit optical communications channels at wavelength $\lambda 1, \lambda 2 \ldots \lambda N$, respectively. Multiplexer 210 multiplexes these signals together to form multiplexed signal 202. Multiplexed signal 202 is launched into optical fiber 204 for transmission to the receiving end. Since optical fiber 204 is a high-capacity trunk, signal 202 is also referred to as "trunk traffic". During transmission, multiplexed signal 202 passes through branching unit 206. Branching unit 206 places multiplexed signal 202 back onto optical fiber 236. At the receiving trunk terminal 215, demultiplexer 212 demultiplexes and routes $\lambda 1, \lambda 2 \ldots \lambda N$ to receivers 208, 218 . . . 220, respectively.

Branching unit 206 places wavelength $\lambda i$ on optical fiber 360 and thereby branches $\lambda i$ to branch terminal 213. The optical information signal of wavelength $\lambda i$ is referred to as "branch traffic," since branching unit 206 branches it from trunk 204 to optical fiber 360. Branch terminal 213 in turn transmits a different optical information signal at wavelength $\lambda i$ onto optical fiber 340. Branching unit 206 replaces $\lambda i$, which was dropped onto optical fiber 360, with the $\lambda i$ it receives from branch terminal 213 on optical fiber 340. The branch unit 206 multiplexes this $\lambda i$ with $\lambda 1, \lambda 2, \ldots \lambda n$, forming multiplexed optical signal 234, which is launched on optical fiber 236 toward receiving trunk terminal 215. Optical fibers 362 and 342 are used to add and drop traffic from terminal 215 in a manner similar to that described above for terminal 211.

It is worthy to note that multiplexed signal 234 is different from multiplexed signal 202 since the optical information signal of wavelength $\lambda i$ has been replaced with a different optical information signal of wavelength $\lambda i$. That is, although multiplexed signal 202 and 234 may include the same signal wavelengths, they do not necessarily carry the same information.

Figure 2A:
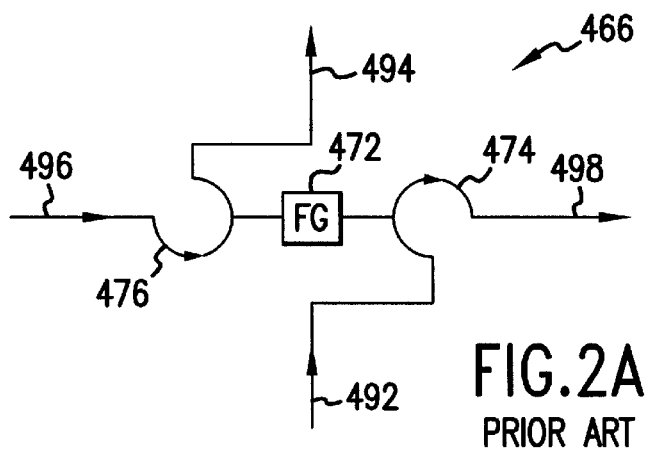
FIG. 2(*a*) is a schematic diagram of a known ADM.

FIG. 2(a) is an example of an ADM of the type disclosed in U.S. Appl. Ser. No. 08/728,591. The ADM shown in this and subsequent figures, is typically incorporated in a BU as previously described. ADM 466 passes all wavelengths but the wavelength(s) being added or dropped (e.g., $\lambda i$). FIG. 2(a) shows trunk in 496, trunk out 498, branch in 492, branch out 494, and circulators 476 and 474, all of which are connected through a reflective filter 472. In this example, reflective filter 472 is a Bragg grating. Other examples of filters 472 include diffraction gratings, interference induced gratings, Fabry-Perot etalon, wavelength router, or any other mechanism for selectively passing wavelengths.

As signals of varying wavelength pass from branch in 492, they are directed by circulator 474 through fiber grating 472. Fiber grating 472 reflects the bragg wavelength and passes all other wavelengths. In this manner, the desired wavelength can be added to the multiplexed signal placed on trunk out 498, while those signals with destinations at other ADMs pass onto branch out 494.

Figure 2B:
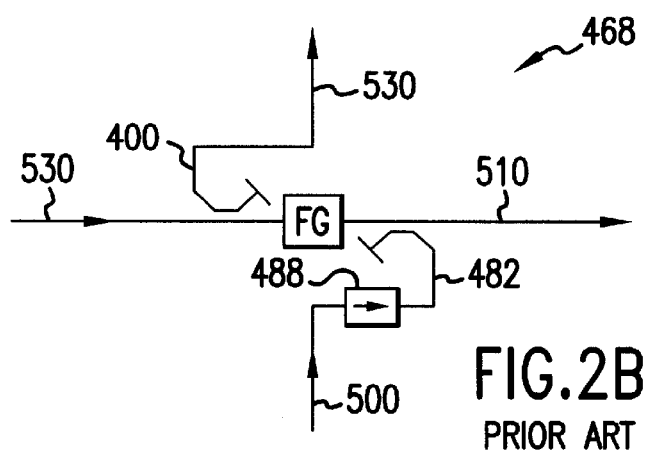

FIG. 2(b) illustrates another example of the ADM 206 disclosed in U.S. Appl. Ser. No. 08/728,591. The ADM 468 performs the same function as the ADM shown in FIG. 2(a), except it does so using couplers rather than circulators. An opto-isolator 484 is added to coupler 488 used for branch in 500, to prevent signals from entering branch in 500.

Figure 2C:
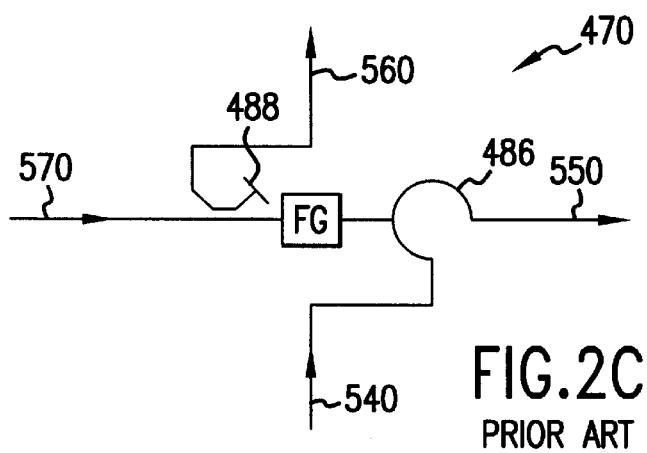

FIG. 2(c) illustrates yet another example of an ADM disclosed in the previously mentioned patent application. As with ADM 466 and 468, ADM 470 performs the identical function. ADM 470, however, uses coupler 488 and circulator 486 to perform this function. Notice that placement of circulator 486 on the branch in side of the ADM removes the need for an additional opto-isolator, thereby reducing the overall number of components.

Figure 3:
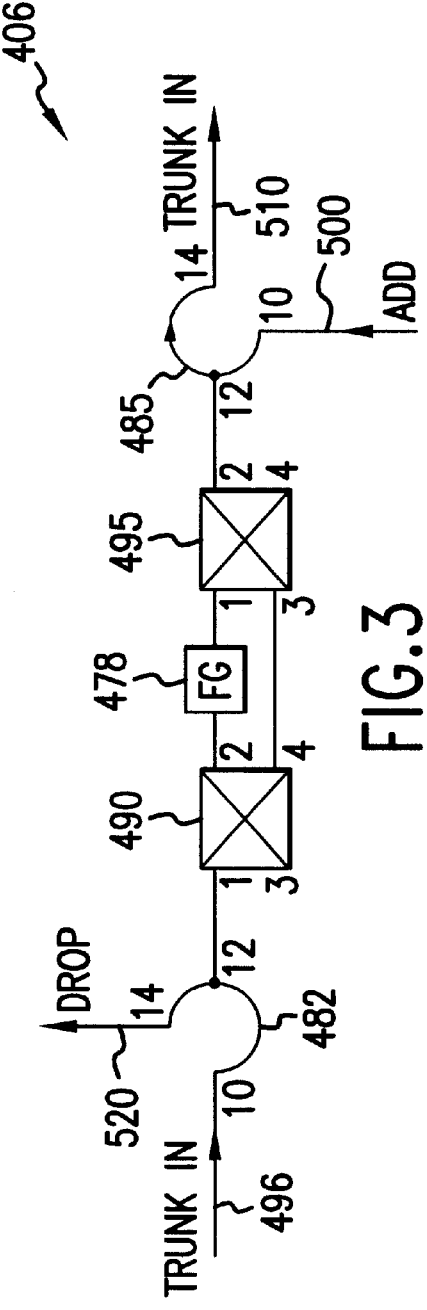
FIG. 3 is a schematic diagram of an ADM in accordance with an embodiment of the present invention.

FIG. 3 shows one embodiment of the ADM 406 constructed in accordance with the present invention. ADM 406 is designed to both selectively transmit and drop a predetermined wavelength. FIG. 3 shows trunk in 496, trunk out 510, branch in 500, branch out 520, cross-bar switches 490 and 495, 3-port circulators 482 and 485, and fiber grating 478. Cross bar switches 490 and 495 operate in two states. In a first or normal state, a signal directed to inputs 1 or 3 is transferred to ports 2 and 4, respectively. In a second or switched state, a signal directed to inputs 1 or 3 is transferred to ports 4 or 2, respectively. Cross bar switches 490 and 495 function symmetrically. That is, in the normal state, a signal directed to inputs 2 or 4 is transferred to ports 1 or 3, respectively, and in the switched state a signal directed to inputs 2 or 4 is transferred to ports 3 or 1, respectively.

In FIG. 3, trunk in 496 is connected to input port 10 of circulator 482 and branch out 520 is connected to output port 14 of circulator 482. Intermediate port 12 of circulator 482 is connected to port 1 of cross bar switch 490. Port 2 of cross bar switch 490 is connected to fiber grating 478, which in turn is connected to port 1 of cross bar switch 495. Port 4 of cross bar switch 490 is connected to port 3 of cross bar switch 495. Branch in 500 is connected to input port 10 of circulator 485. Port 2 of cross bar switch 495 is connected to intermediate port 12 of circulator 485. Trunk out 510 is connected to output port 14 of circulator 485. The various circulators, switches, and grating shown in FIG. 3 are all interconnected by optical fibers. As detailed below cross bar switches 490 and 495 are each operable in two different states. The particular state in which the switches 490 and 495 are placed is determined by a command signal that is transmitted to the respective switch in a known manner. The command signal may be in optical or electrical form.

Since the cross bar switch 490 used in the FIG. 3 embodiment of the invention only employs one input port and two output ports, the switch 490 need not be a 2×2 cross bar switch. Rather, only a 1×2 cross bar switch is required. Similarly, cross bar switch 485 may be a 1×2 or a 2×2 cross bar switch.

In operation, ADM 406 drops and adds a predetermined wavelength $\lambda 1$ when cross bar switches 490 and 495 are in the appropriate states, while transmitting all remaining wavelengths from trunk in 496 to trunk out 510. Alternatively, ADM 406 may be directed to transmit all wavelengths, including predetermined wavelength λ1, by changing the states of cross bar switches 490 and 495. More specifically, cross bar switches 490 and 495 always remain in the same state (either normal or switched). If switches 490 and 495 are in their normal state (so that a signal directed to ports 1 and 3 is directed to ports 2 and 4, respectively) an incoming WDM signal arriving on trunk in 496 will be directed to port 2 of cross bar switch 490 via intermediate port 12 of circulator 482 and port I of cross bar switch 490. Fiber grating 478 is arranged to reflect wavelength λ1 and transmit all other wavelengths. Accordingly, fiber grating 478 reflects wavelength λ1 back through port 2 of cross bar switch 490, which in turn directs wavelength λ1 to port 1 of cross bar switch and ultimately, via circulator 482, to branch out 520. All remaining wavelengths other than λ1 will be transmitted through fiber grating 478 to port 1 of cross branch switch 495. Since cross branch switch 495 is in its normal operating state, the remaining wavelengths will be directed to port 2 of cross branch switch 495 and ultimately, via circulator 485, trunk out 510.

Wavelength λ1 can be added to trunk out 510 as follows. Wavelength λ1 is directed along branch in 500 to port 2 of cross bar switch 495 via circulator 485. Since cross bar switch 495 is in its normal operating state, wavelength λ1 is transmitted through port 1 of switch 495 and is reflected by fiber grating 478 back through port 1 to port 2 of switch 495. Finally, wavelength λ1 is directed to intermediate port 12 of circulator 485 so that it appears on trunk out 510 via output port 14 of circulator 485.

If the states of cross bar switches 490 and 495 are changed to their switched states, all wavelengths directed along trunk in 496 will appear on trunk out 510. No wavelengths will be added or dropped. An incoming WDM signal arriving on trunk in 496 will be directed to port 1 of cross bar switch 490 via intermediate port 12 of circulator 482. Since cross bar switch 490 is in its switched state, the WDM signal appears on port 4 of cross bar switch 490 so that it is directed to port 3 of cross bar switch 495. Accordingly, since the WDM signal avoids fiber grating 478 all the individual wavelengths, including λ1, arrive at port 3 of cross bar switch. Since cross bar switch 495 is also in its switched state, the WDM signal is directed from port 3 to 2 and to trunk out 510 via circulator 485.

In summary by sending the appropriate commands to cross bar switches 490 and 495, the ADM 406 is configured so that predetermined wavelength λ1 reaches its desired destination. Specifically, when the switches 490 and 495 are in their switched state, all the wavelengths are transmitted to the trunk out and none are dropped or added. When the switches 490 and 495 are in their normal state, predetermined wavelength λ1 is dropped and added while the remaining wavelengths are transmitted to trunk out 510.

Figure 4:
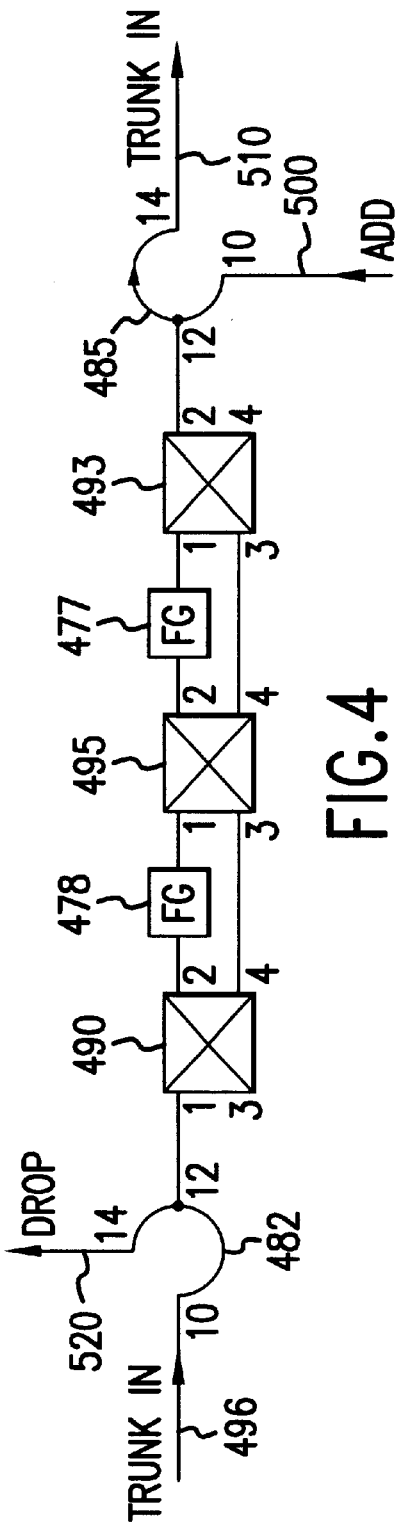
FIG. 4 shows a schematic diagram of an alternative embodiment of the ADM constructed in accordance with the present invention.

The ADM shown in FIG. 3 is reconfigurable to extent that the destination of a single wavelength, e.g., λ1, can be changed. In other embodiments of the invention the destination of two or more wavelengths may be directed independently of one another. For example, in the embodiment of the invention shown in FIG. 4 wavelengths λ1 and λ2 can be added/dropped or transmitted. Depending on the state of the cross bar switches, none, one or both wavelengths λ1 and λ2 may be added and dropped. As seen in FIG. 4, this result is achieved by cascading together multiple ones of the ADMs shown in FIG. 3.

The ADM shown in FIG. 4 includes cross bar switches 490, 495 and 493. Circulator 482 switches 490 and 495 and fiber grating 478 are arranged as previously described with respect to FIG. 3. An additional cross bar switch 493 and an additional fiber grating 477, however, are inserted between switch 495 and circulator 485. More specifically, ports 2 and 4 of switch 495 are respectively connected to ports I and 3 of switch 493. Fiber grating 477 is inserted in the path between port 2 of switch 495 and port 1 of switch 493. Fiber grating 477 is arranged to reflect wavelength λ2 and transmit all other wavelengths. In operation, wavelength λ1 can be add/dropped or transmitted in the same manner discussed above in connection with FIG. 3. When λ1 is to be transmitted, for example, switches 490 and 495 are placed in their switched states and switch 493 is placed in its normal state. Wavelength λ1 will be transmitted through fiber grating 477 since grating 477 transmits all wavelengths but λ2. Alternatively, if it is desired to drop both λ1 and λ2, for example, switches 490, 495, and 493 are all placed in their normal states. If only λ2 is to dropped, switches 490 and 495 placed in their switched states, and switch 493 is placed in its normal state.

One of ordinary skill in the art will recognize that the present invention as shown in FIG. 4 may be readily extended to selectively add/drop or transmit more than two predefined wavelengths. This is accomplished by adding an additional cross bar switch and fiber grating for each additional wavelength. The fiber grating is selected to transmit all wavelengths but the additional wavelength.

Similar to the known arrangements shown in FIGS. 2(a) and 2(c), other embodiments of the invention may incorporate circulators rather than couplers.

Figure 5:
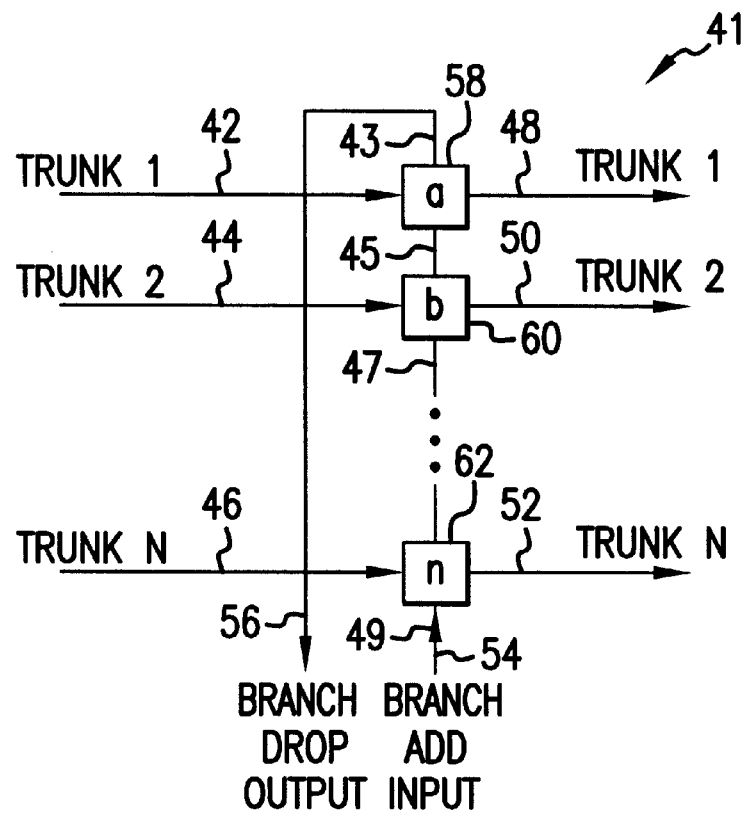
FIG. 5 is a block diagram in accordance with a BU incorporating the ADMs shown in FIGS. 3 or 4.

FIG. 5 is a block diagram of a BU that includes a plurality of the ADMs shown in FIGS. 3 or 4. FIG. 5 shows system 41 having input trunk 1, trunk 2 . . . trunk N, referred to as 42, 44 and 46, respectively. System 41 also has output trunk 1, trunk 2 . . . trunk N, referred to as 48, 50 and 52, respectively. In addition, system 41 uses fiber pair referred to as branch add input 54 and branch drop output 56. Finally, ADMs 58, 60 and 62 are all attached to branch add input 54 and branch drop output 56, as well as to trunk pairs 42 and 48, 44 and 50, and 46 and 52, respectively.

More particularly, the ADMs are configured such that the branch out line of one ADM becomes the branch in line of an adjacent ADM. Thus, the topology of system 41 is such that optic fiber 47 serves as both the branch out of ADM 62 and the branch in of ADM 60. Similarly, optic fiber 45 serves as both the branch out of ADM 60 and branch in of ADM 58. Optic fiber 43 serves as the branch out of ADM 58. In this embodiment, optic fiber 43 directs the dropped signal to any desired location. It is, however, possible for optic fiber 43 to serve as the branch in for ADM 62.

Thus configured, system 41 has a single fiber pair to add and drop signals from multiple trunk lines using multiple ADMs. Since ADM 406 only permits those signals of wavelengths different from the added signal and dropped signal, there exists only four possibilities for processing signals through ADM 406, summarized in the following table:

|  | Trunk Out | Branch Out |
| --- | --- | --- |
| Trunk In | All but λi | λi |
| Branch In | λi | All but λi |

Therefore, since ADM 406 passes all wavelengths except the Bragg wavelength (or branching wavelength), ADM 58, 60 and 62 is transparent with respect to these wavelengths.

The present embodiment of the invention can be illustrated through the following example. Let an incoming multiplexed signal be defined as containing signals of wavelength λ1 to λ5 carried on input trunk lines 42, 44 and 46. Further, assume that ADM 62 branches out wavelengths λ2 and λ3, ADM 60 branches out 5, and ADM 58 branches out λ1 and λ4.

As described below, λ1 to λ5 are dropped from trunk in 42, 44 and 46 and branched to a desired destination using only a single fiber pair. As λ1 to λ5 pass into ADM 62 from trunk in 42, ADM 62 branches out λ2 and λ3 onto optic fiber 47, which carries these signals into ADM 60. Since the passing device (not shown) of ADM 60 reflects only wavelength λ5, wavelengths λ2 and λ3 pass through ADM 60 onto fiber optic 45 to ADM 58. ADM 60 also branches out λ5 from trunk in 44 onto fiber optic 45 as well. Thus, λ2, λ3 and λ5 are transmitted to ADM 58. Since the passing device (not shown) of ADM 58 only reflects wavelengths λ1 and λ4, wavelengths λ2, λ3 and λ5 pass through ADM 58 onto fiber optic 43. At the same time, λ1 and λ4 from trunk in 42 are placed onto fiber optic 43 by ADM 58.

Similarly, λ1 to λ5 can be added to trunk out 48, 50 and 52. If we assume λ1 to λ5 are transmitted into ADM 62 from fiber optic 54, the passing device of ADM 62 reflects λ2 and λ3 which are multiplexed together with wavelengths λ1, λ4 and λ5 from trunk in 46, and sent over trunk out 52. As λ1, λ4 and λ5 pass into ADM 60, the passing device of ADM 60 reflects λ5 which is multiplexed together with λ1 to λ4 from trunk in 44, and sent over trunk out 50. Finally, as λ1 and λ4 pass into ADM 58, the passing device of ADM 58 reflects λ1 and λ4 which are multiplexed together with λ2, λ3 and λ5 from trunk in 42, and sent over trunk out 48.

FIG. 6 is a block diagram of another multi-trunk, multi-ADM BU that incorporates a plurality of ADMs of the type shown in FIGS. 3 and 4. In this arrangement an additional switch 491 is employed between the branch out 86 of ADM 104 and the branch in of ADM 88. The addition of switch 491 provides the BU with additional flexibility. When switch 491 is in its normal state, the BU operates as explained above in connection with FIG. 5. When switch 491 is in its switched state, the BU operates in a so-called "all-but" state in which all wavelengths are dropped except for a selected wavelength or wavelengths. For example, if wavelength λk is reflected by either grating 478 or grating 477 to branch out 86, λk will be dropped if switch 491 is in its normal state but will be transmitted to branch out 78 if switch 491 is in its switched state.

Figure 7:
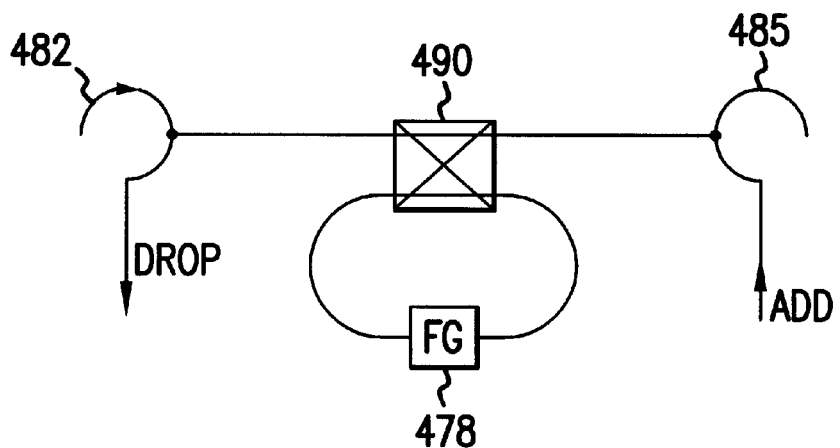
FIG. 7 is an alternative embodiment of the ADM shown in FIG. 3 in which only a single cross-bar switch is employed.

Although various embodiments are specifically illustrated and described herein, it will be appreciated that modifications and variations of the present invention are covered by the above teachings and are within the purview of the appended claims without departing from the spirit and intended scope of the invention. For example, the functionality of the inventive ADM shown in the FIG. 3 embodiment may be accomplished in other embodiments with only a single cross-bar switch. FIG. 7 shows one such embodiment.

What is claimed is:

1. A system using a single fiber pair for carrying branch traffic from a plurality of branching units attached to a plurality of trunk fibers, comprising:

a plurality of optical fiber trunks for carrying trunk traffic;

a plurality of branching units, each attached to one said fiber trunks, and each having an add and drop port;

a first reflective filter in each of said branching units for passing said branch traffic from said add port to said drop port of each of said branching units; and a single fiber pair connecting said branching units for carrying branch traffic between said branching units, wherein at least one of said branching units includes:

first and second cross bar switches each having at least a first, second and third ports such that in a first state said first cross bar directs an optical signal appearing on the first port to the second output port and in a second state said first cross bar directs the optical signal from the first port to the third port;

a reflective filter coupling said third port of the first switch to said third port of the second switch, said reflective filter being configured to reflect a prescribed wavelength and to transmit therethrough all remaining wavelengths forming the WDM signal;

an optical fiber coupling the second port of the first switch to the second port of the second switch;

first and second circulators each having an input, output and intermediate ports, said intermediate port of said first and second circulators being coupled to said first port of said first and second switches, respectively;

wherein said input port of said first circulator is adapted to receive the WDM signal from the transmitting terminal and said output port of said first circulator is adapted to receive said prescribed wavelength and transmit said prescribed wavelength to a branching terminal, and further wherein said input port of said second circulator is adapted to receive the prescribed wavelength from a branching terminal and said output port of said second circulator is adapted to receive the WDM signal and transmit the WDM signal to a receiving terminal.

2. The branching unit of claim 1 wherein said at least one of said branching units further comprises a reflective filter unit that includes a second reflective filter and a third cross bar switch, said second fiber grating being coupled to a first port of said third bar switch, said reflective filter unit being coupled between said second cross bar switch and said second circulator.

3. The branching unit of claim 2 wherein said second reflective filter is configured to reflect a wavelength different from said prescribed wavelength and to transmit therethrough all remaining wavelengths forming the WDM signal.

4. The branching unit of claim 3 wherein at least one of said first and second reflective filters is a fiber Bragg grating.

5. The branching unit of claim 2 wherein said first and second reflective filters are selected from the group consisting of diffraction gratings, interference induced gratings, Fabry-Perot etalons, and wavelength routers.

6. The branching unit of claim 1 wherein said at least one of said branching units further comprises a fourth cross bar switch having at least a first, second, third and fourth ports such that in a first state said fourth cross bar switch directs an optical signal appearing on the first and fourth ports to the second and third ports, respectively, and in a second state said fourth cross bar switch directs the optical signal from the first and fourth ports to the third and second ports, respectively.

7. The branching unit of claim 6 wherein said first and fourth ports of said fourth cross bar switch are respectively coupled to said output ports of said first and second circulators.

8. The branching unit of claim 7 wherein said second port of said fourth crossbar switch is connected to an add port of another of said branching units.

9. A branching unit for directing individual wavelengths of a WDM optical communication signal among a transmitting terminal, a receiving terminal and a branch terminal, said branching unit comprising:

at least a first cross bar switch having first, second, third and fourth ports such that in a first state said first cross bar directs an optical signal appearing on the first and fourth ports to the second and third ports, respectively, and in a second state said first cross bar directs the optical signal from the first and fourth ports to the third and second ports, respectively;

a reflective filter coupling said third port of the first switch to said fourth port of the first switch, said reflective filter being configured to reflect a prescribed wavelength and to transmit therethrough all remaining wavelengths forming the WDM signal;

first and second circulators each having an input, output and intermediate ports, said intermediate port of said first and second circulators being respectively coupled to said first and second ports of said first switch;

wherein said input port of said first circulator is adapted to receive the WDM signal from the transmitting terminal and said output port of said first circulator is adapted to receive said prescribed wavelength and transmit said prescribed wavelength to the branching terminal, and further wherein said input port of said second circulator is adapted to receive the prescribed wavelength from the branching terminal and said output port of said second circulator is adapted to receive the WDM signal and transmit the WDM signal to the receiving terminal.

10. The branching unit of claim 9 further comprising a reflective filter unit that includes a second reflective filter and a second cross bar switch, said second reflective filter coupling said third and fourth ports of said second switch, said reflective filter unit being coupled between said first cross bar switch and said second circulator.

11. The branching unit of claim 10 wherein said second reflective filter is configured to reflect a wavelength different from said prescribed wavelength and to transmit therethrough all remaining wavelengths forming the WDM signal.

12. The branching unit of claim 10 wherein at least one of said first and second reflective filters is a fiber Bragg grating.

13. The branching unit of claim 10 wherein said first and second reflective filters are selected from the group consisting of diffraction gratings, interference induced gratings, Fabry-Perot etalons, and wavelength routers.

* * * * *